United States Patent [19]

Shul et al.

[11] Patent Number: 5,582,819
[45] Date of Patent: Dec. 10, 1996

[54] FIBROUS ZEOLITE AND PREPARATION METHOD THEREOF

[75] Inventors: Yong-gun Shul; Cheon-hee Lee; Young-chul Gil; Du-soung Kim, all of Seoul, Rep. of Korea

[73] Assignee: Daelim Engineering Co., Ltd., Seoul, Rep. of Korea

[21] Appl. No.: 461,702

[22] Filed: Jun. 5, 1995

[30]  Foreign Application Priority Data

Feb. 24, 1995 [KR]  Rep. of Korea ........................ 95-3642

[51] Int. Cl.$^6$ ................................................. C01B 39/08
[52] U.S. Cl. ........................... 423/705; 423/713; 423/716; 502/77
[58] Field of Search ...................... 423/705, 713, 423/716, DIG. 22; 502/77

[56]  References Cited

U.S. PATENT DOCUMENTS

| | | | |
|---|---|---|---|
| 4,205,053 | 5/1980 | Rollmann et al. | 423/705 |
| 4,410,501 | 10/1983 | Taramasso et al. | 423/713 |
| 4,425,143 | 1/1984 | Nishizawa et al. | |
| 4,525,410 | 6/1985 | Hagiwara et al. | 428/198 |
| 4,606,901 | 8/1986 | Chu et al. | 423/DIG. 22 |
| 5,460,796 | 10/1995 | Verduhn | 423/716 |

FOREIGN PATENT DOCUMENTS 0156595  10/1985  European Pat. Off. .

Primary Examiner—Karl Group
Assistant Examiner—David Sample
Attorney, Agent, or Firm—Morgan & Finnegan LLP

[57]  ABSTRACT

There are disclosed a fibrous zeolite and a preparation method thereof wherein the fibrous zeolite, represented as $xTiO_2 \cdot (1-x)SiO_2$ (x is 0.02~0.1), which is easy to adsorb and desorb, and is easy to use as a functional material, and can be directly used as a reinforcement material.

4 Claims, 4 Drawing Sheets

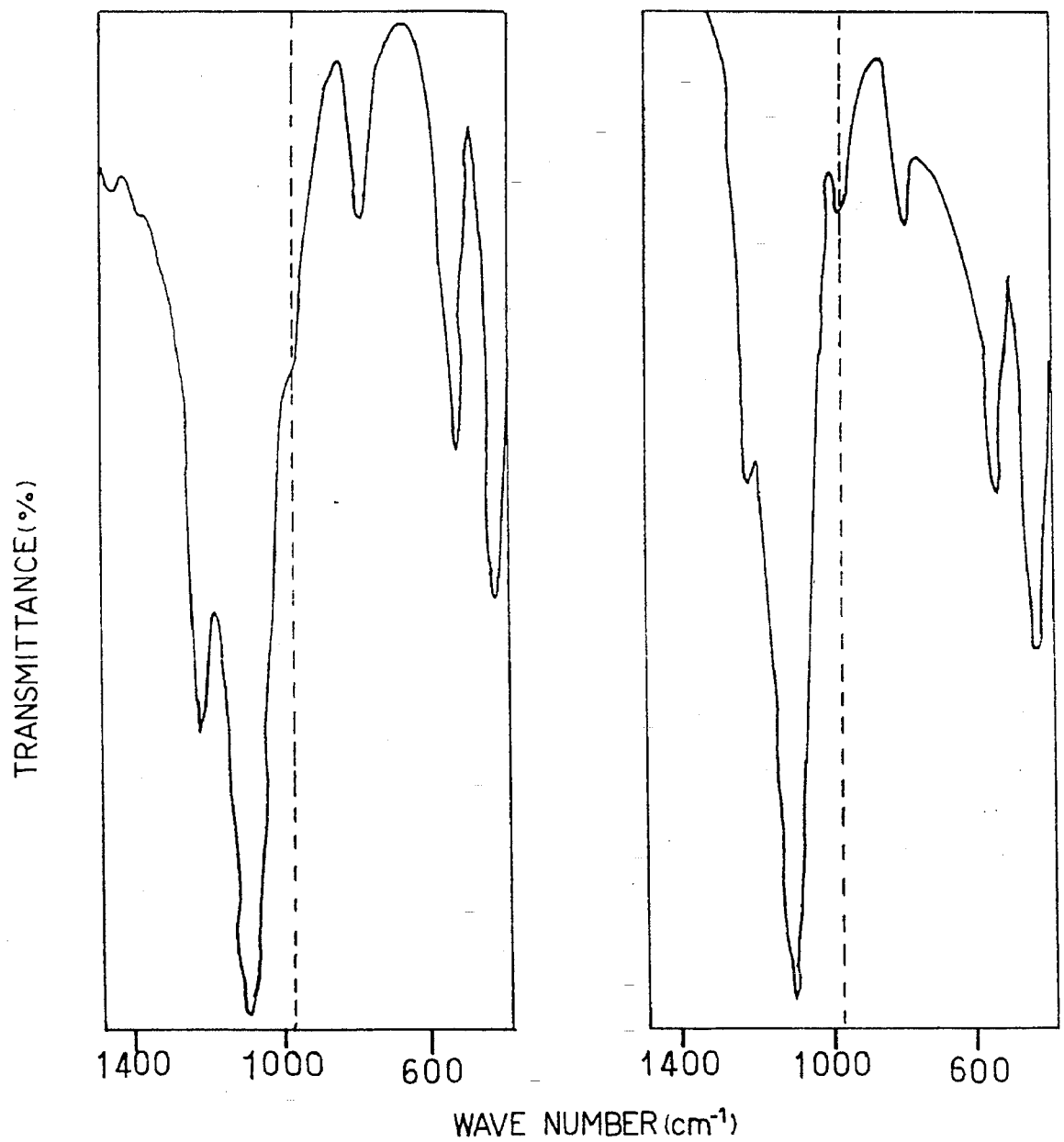

FIBROUS ZEOLITE AND PREPARATION METHOD THEREOF

BACKGROUND OF THE INVENTION

The present invention relates to a fibrous zeolite and a preparation method thereof, and more particularly, to a fibrous zeolite which is easy to use as a functional material, can be easily adsorbed and desorbed when used as a catalyst, and can be directly used as a reinforcement material and preparation method thereof.

Scientific and industrial research into zeolite has been very active in the catalyst field since the discovery of stilbite, a natural zeolite. Currently, 34 kinds of natural zeolites are known, however industrial use thereof is limited due to pore size, crystalline structure and purity. Therefore, a powdered zeolite is synthesized and widely used as a detergent, a catalyst, an adsorbent and a moisture absorbent.

A natural or synthetic powdered zeolite can be used as a catalyst for conversion reactions of many kinds of hydrocarbons. Also, since a powdered zeolite can selectively adsorb molecules which have a predetermined form and size due to its uniform pore structure, it is called as a molecular sieve.

Several types of synthetic powdered zeolites are prepared using various methods of synthesis. Different kinds of synthetic zeolite with variable ratios of $SiO_2/Al_2O_3$ as a main component include zeolite X (U.S. Pat. No. 2,882,244), zeolite Y (U.S. Pat. No. 3,130,007), and ZSM-5 (U.S. Pat. No. 3,702,886).

As another kind of synthetic zeolite, U.S. Pat. No. 4,410,501 discloses a titanium-silicalite (hereinafter, referred to as TS-1) which substitutes titanium oxide for aluminum oxide in the conventional zeolite composed of aluminum oxide and silicon oxide. The term, TS-1 is also cited in European Patent Application Nos.267,362 and 190,609.

TS-1 has excellent selection characteristics to specific products due to the use of titanium oxide instead of aluminum oxide. That is, TS-1 has an industrially specific catalytic function in the epoxidation of unsaturated hydrocarbons; hydroxidation of aromatic hydrocarbons; oxidation of saturated hydrocarbons and alcohols; and the hydration of benzenes, phenols and alkanes. Also, TS-1 is used as a catalyst in many other reactions such as a methanation, oxidation and dehydration of aliphatic hydrocarbons containing an oxygen; polymerization of compounds having olefinic or acetylenic bonds; cracking, hydrocracking and isomerization of n-paraffins and naphthenes.

Most synthetic zeolites for such uses are prepared by hydrothermal synthesis at a high temperature (130°~200° C.) and under high pressure (20~80 air pressure). The synthetic zeolite thus prepared is in powder form having a particle size ranging from 0.1 μm to several μm.

A conventional zeolite is difficult to use directly because of this powder form, and therefore several methods for using conventional powdered zeolite have been disclosed. In one such method, the powdered zeolite is blended with another inactive ingredient such as alumina and made into a pellet form for use as an adsorbent in the adsorbing process. In this case, however, it is difficult to properly use the adsorption surface because the reactant's diffusion rate is reduced when the pressure differences in a packed column increase excessively.

Recently, a preparation of a film form of zeolite for use as an effective separating membrane was disclosed. By the method, a thin layer of zeolite is formed onto a support such as Teflon, a filter paper or stainless steel by using a hydrothermal method [Sano et al, J. Mater. Chem., 2, 141 (1992)]. A film form of zeolite with few surface faults such as pinhole or crack is still under study.

A method for mixing a crystalline zeolite with a polyamide fiber, and then spinning the mixture to produce a textile form of zeolite is disclosed in Japanese Patent Laid-Open Publication No. Hei 4-333,639. Also, a method for coating a zeolite onto a ceramic fiber is disclosed in Japanese Patent Laid-Open Publication No. Hei 5-131,139. However, this method is difficult to apply due to its complexity.

As described above, there is difficulty in utilizing the powdered zeolite due to the complexity of its application.

SUMMARY OF THE INVENTION

An object of the present invention is to provide a fibrous zeolite which is easily adsorbed and desorbed when used as a catalyst, is easy to use as a functional material, and can be directly used as a reinforcement material.

Another object of the present invention is to provide a preparation method of a fibrous zeolite which is easily adsorbed and desorbed when used as a catalyst, is easy to use as functional material, and can be directly used as reinforcement material, by using a zeolite particle having a size less than 150 nm.

To achieve the first object, the present invention provides a fibrous zeolite composed of silicon oxide and titanium oxide and represented as;

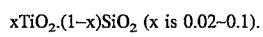

$xTiO_2 \cdot (1-x)SiO_2$ (x is 0.02~0.1).

To achieve the second object, a preparation method of a fibrous zeolite according to the present invention includes the steps of:

(i) (a) preparing at least one silicon oxide source selected from the group consisting of tetraethylorthosilicate and silica gel;

(b) mixing the silicon oxide source with at least one organic base selected from the group consisting of tetramethylammonium hydroxide, tetraethylammonium hydroxide, tetrabutylammonium hydroxide, tetrapropylammonium bromide, pyrrolidine, propylamine, dipropylamine and tripropylamine in a molar ratio of 10:1–10:8, by agitation;

(c) diluting a hydrolyzable titanium compound with isopropyl alcohol to a final concentration of 15~25 wt %;

(d) adding the dilution product obtained in step (c) slowly to the mixture obtained in step (b) until the molar ratio of the titanium compound and the silicon oxide source reaches 1:50~1:10;

(e) heating the mixture obtained in step (d) to eliminate alcohol;

(f) adding 15~50 moles of water per 1 mole of the silicon oxide source contained in the mixture to the mixture obtained in step (e);

(g) maintaining the mixture obtained in step (f) at a temperature range of 60°~100° C. and under atmospheric pressure to obtain a mother liquor containing a zeolite crystal;

(ii) centrifuging the mother liquor obtained in step (i) to separate the zeolite crystal from the mother liquor; and (iii) dispersing the zeolite crystal obtained in step (ii) into water in the final concentration of 0.5~2 wt %, and evaporating water to form fibrous zeolite.

More particularly, the zeolite crystal is preferably formed when 100~400 weight % of water based on the weight of the mother liquor obtained in step (i) is added to the mother liquor just prior to the step of centrifuging the mother liquor.

BRIEF DESCRIPTION OF THE DRAWINGS

The above objects and advantages of the present invention will become more apparent by describing in detail a preferred embodiment thereof with reference to the attached drawings in which:

FIGS. 5A and FIG. 5B are FT-IR spectra of fibrous zeolites according to an embodiment of the present invention.

DETAILED DESCRIPTION OF THE INVENTION

Figure 1:
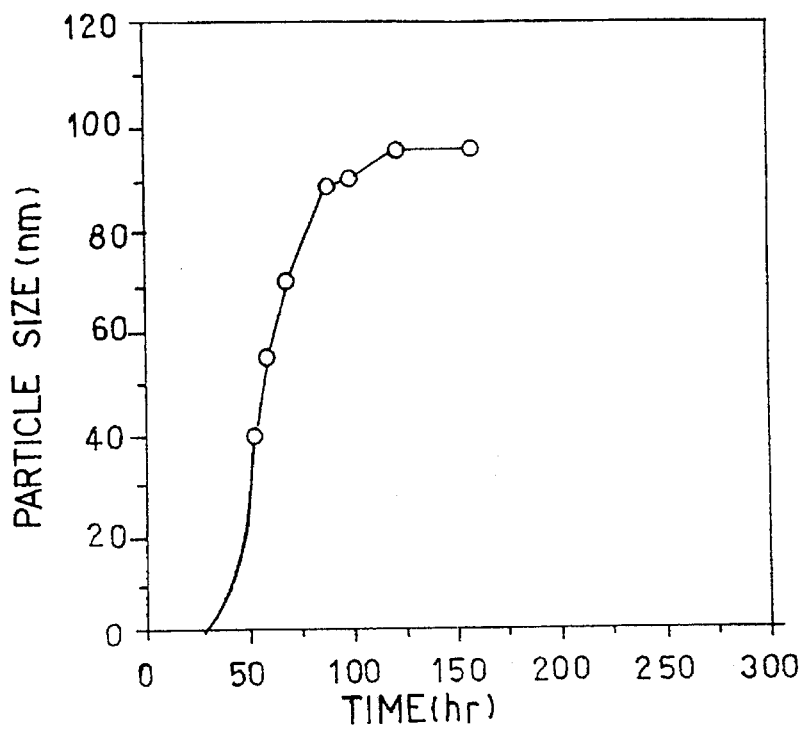
FIG. 1 is a graph representing a particle size over time when zeolite crystal particles are formed according to an embodiment of the present invention.

According to the present invention, a zeolite formed only into a powder form according to the conventional method is formed into a fibrous form. That is, unlike conventional hydrothermal synthesis at a high temperature and under high pressure, a fibrous zeolite of the present invention is formed by synthesizing a zeolite crystal having a predetermined particle size at a low temperature and under atmospheric pressure, and then forming the zeolite crystal into the fibrous form under appropriate conditions. At this time, the particle size of the zeolite crystal for formation of the fibrous form should be less than 150 nm, and preferably is less than 120 nm.

The temperature range for obtaining the particle size less than 150 nm under atmospheric pressure is 60°~100° C., since it takes a long time to obtain a zeolite crystal at temperatures below 60° C. and the zeolite crystal is rarely formed into the fibrous form at temperature over 100° C. due to a particle size exceeding 150 nm.

The zeolite crystal should be dispersed into water in the final concentration of 0.5~2 wt % to form a zeolite having a particle size of less than 150 nm into the fibrous form.

Finally, the zeolite crystal dispered in water is dried at about 100° C. to form the fibrous zeolite composed of silicon oxide and titanium oxide.

As a reactant for manufacturing the fibrous zeolite according to the present invention, conventional silicon oxide and titanium oxide sources can be utilized.

That is, tetraethylorthosilicate and silica gel, preferably tetraethylorthosilicate can be used as the silicon oxide source. A hydrolyzable titanium compound, such as titanium butoxide, titanium ethoxide, titanium isopropoxide, titanium tetrachloride, titanium oxychloride and so on, is used as the titanium oxide source.

The organic base to be mixed with the silicon oxide source dissolves the silicon oxide source of gel state to facilitate the reaction with the titanium oxide source. However, it is disadvantageous that the growth of the zeolite crystal is hindered at high pH level. Therefore, to obtain the zeolite crystal by a proper reaction rate, the organic base is added to the silicon oxide source in a molar ratio of 10:1~10:8.

Hereinafter, the preparation process will be concretely explained with following examples and comparative examples, but the invention is not limited thereto.

EXAMPLE 1

1) Preparation of a zeolite crystal 90 g of tetraethylorthosilicate (TEOS) and 154 g of 20% aqueous tetrapropylammonium hydroxide (TPAOH) solution were mixed by agitation. In a separate vessel, 4.4 g of titanium butoxide was diluted with 20 g of isopropyl alcohol, and then the diluted solution is slowly dropped into the mixture of tetraethyl orthosilicate and tetrapropylammonium hydroxide. Thereafter, the reaction mixture was heated to the temperature of about 80° C. to eliminate the alcohol. 156 g of water was then added to the reaction mixture. The reaction mixture (RM) has a composition in terms of molar ratios as follows;

Ti/Si=0.03

$H_2O$/Si=20

TPAOH/Si=0.35.

While maintaining atmospheric pressure and a temperature of 80° C. so that the reaction mixture can react, a mother liquor which is a solution containing particles grown after terminating the reaction was sampled over time to measure the size of the particles according to the DLS (Dynamic Light Scattering) method.

FIG. 1 is a graph representing the growth of the zeolite crystal particles over time. Referring to FIG. 1, particles having a size of about 10 nm form after 36 hours and particles having a size of 100 nm after 120 hours. The size of the particles does not increase after 120 hours. As described above, particles having size less than 150 nm can be obtained according to the present invention.

Whether the zeolite particle has crystallizability or not was judged by a diffraction pattern obtained through an X-ray diffraction analytical instrument (D/MAX, Rikagu) and the crystallinity thereof was obtained by calculating the diffraction pattern area based on the final product when crystallization was complete.

Figure 2A:
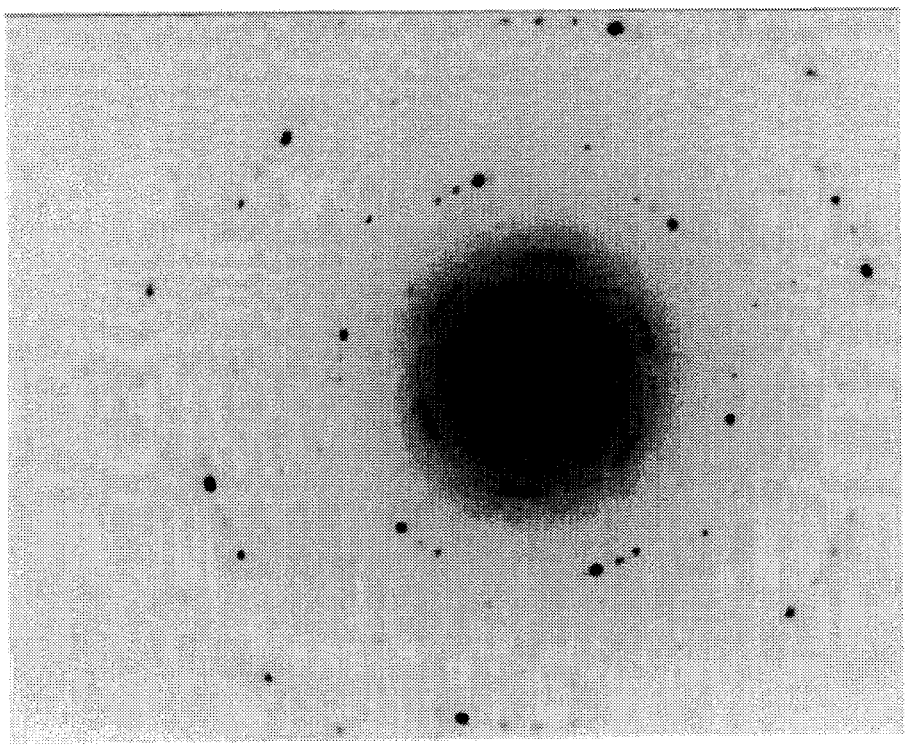
FIG. 2A and FIG. 2B are photographs showing an X-ray diffraction patterns of a zeolite according to an embodiment of the present invention.
Figure 2B:
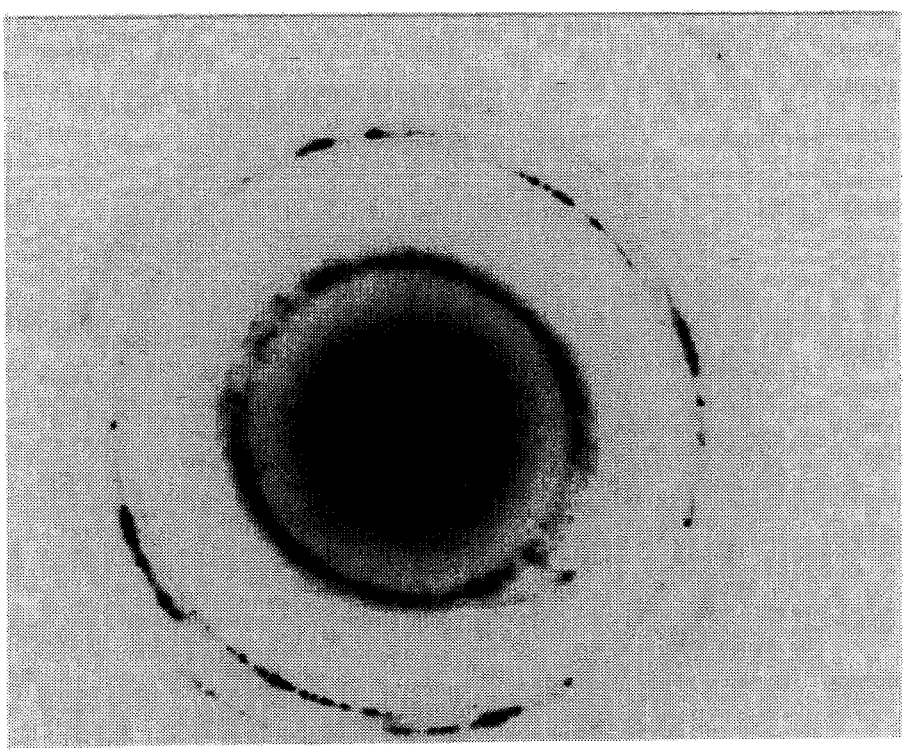

FIGS. 2A and 2B are photographs of X-ray diffraction patterns taken after 60 hours (FIG. 2A) and 120 hours (FIG. 2B) respectively, in order to judge the crystallinity of the obtained particles. As shown in the photographs, the zeolite particle presented enough crystallinity after 60 hours, and was almost fully crystallized after 120 hours.

Figure 3:
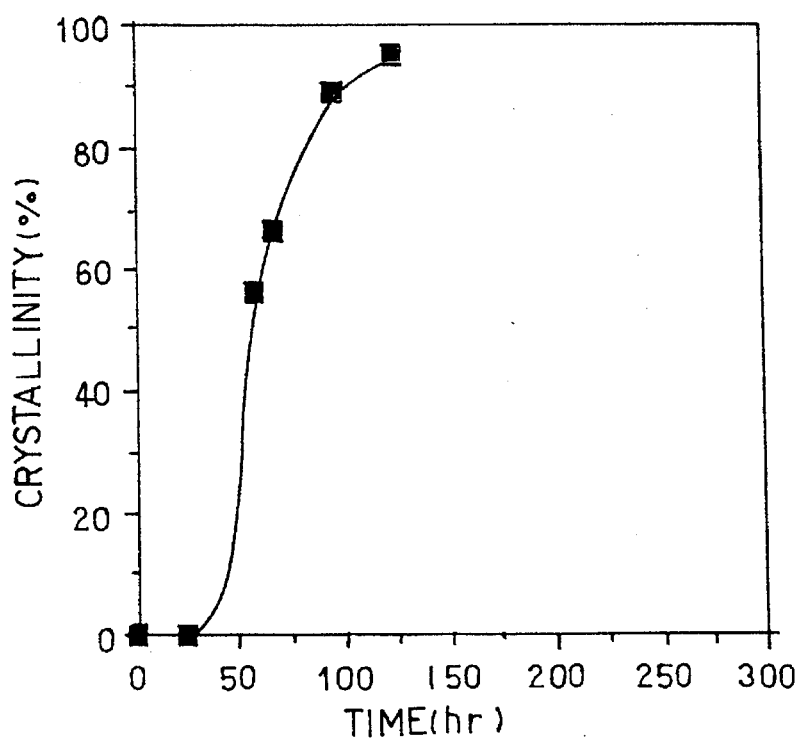
FIG. 3 is a graph representing a crystallinity over time when a zeolite crystal particle is formed according to an embodiment of the present invention.

FIG. 3 is a graph representing the crystallinity which was calculated based on the photographs of the X-ray diffraction patterns. As shown in the graph, crystallization progressed rapidly after 50 hours.

2) Formation of the fibrous zeolite

RM obtained in the step of preparation of a zeolite crystal was reacted for 70 hours to obtain the mother liquor. 300 g of water is added to the obtained mother liquor, which was then centrifuged to separate out crystal particles. The obtained crystal particles were dispersed in water in the concentration of 0.5 wt %. The dispersed solution was dried for 10 hours at 100° C. and an optical microphotograph was taken of the resultant compound.

Figure 4A:
FIGS. 4A and FIG. 4B are optical microphotographs (20×) of fibrous zeolites formed according to embodiments of the present invention.

FIG. 4A is an optical microphotograph of a zeolite formed into a fibrous form having a size of about 10~50 mm according to the present invention.

3) heat treatment

A portion of the fibrous zeolite obtained in the step of formation of the fibrous zeolite was heated, at the rate of 10° C./min., up to 600° C., at which temperature it was maintained for 5 hours. Cracking or breaking down of the fibrous structure of the zeolite did not occur.

The heat-treated fibrous zeolite and the untreated fibrous zeolite were then subjected to FT-IR spectrum analysis. FIG. 5A is the spectrum of the zeolite which was not heat-treated and FIG. 5B is the spectrum of the heat-treated zeolite. As shown in the spectra, a characteristic peak attributed to the Si—O—Ti bond appears in the vicinity of 970 $cm^{-1}$. In the FT-IR spectrum of the heat-treated fibrous zeolite, the relative intensity at each wave number is as follows;

TABLE 1

| wave number | relative intensity |
| --- | --- |
| 1220~1230 | w |
| 1080~1110 | ms |
| 965~975 | w |
| 795~805 | mw |
| 550~560 | m |
| 450~470 | ms |

*the relatives (s = strong, ms = medium-strong, m = medium,

EXAMPLE 2

Figure 4B:
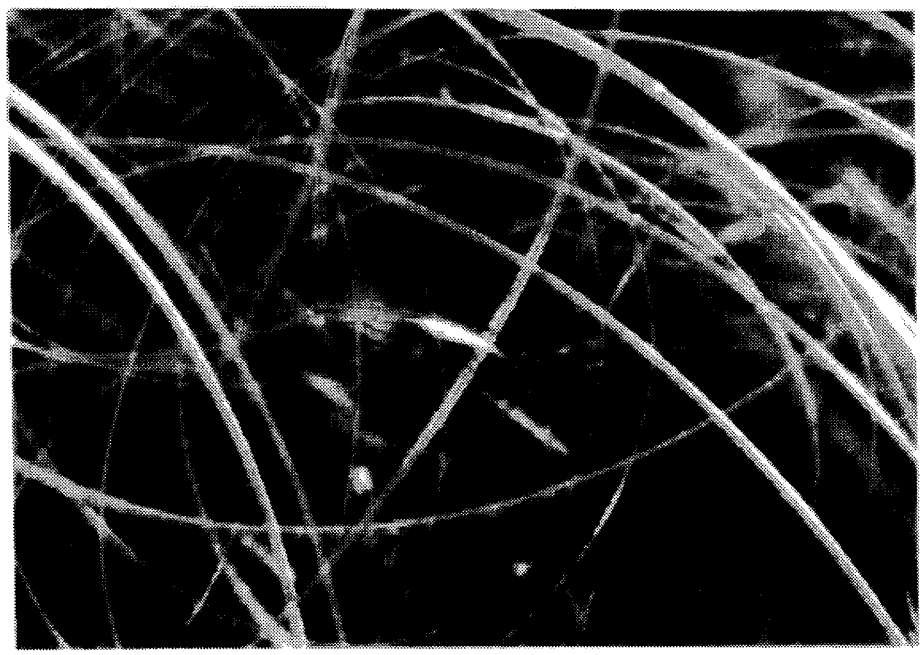

Example 1 was repeated to obtain zeolite crystal particles. The obtained crystal particles were dispersed in water in the concentration of 2 wt %, and then dried and analysed according to the same method as described in Example 1. Analysis results showed that the zeolite crystal formed into the fibrous form as shown in FIG. 4B, though it was inferior in measured characteristics when compared with a fibrous zeolite obtained from Example 1.

EXAMPLE 3–4

Example 1 was repeated twice more using 5.9 g and 14.7 g of titanium butoxide (Ti/Si molar ratios of 0.04 and 0.1, respectively) to ascertain whether the fibrous zeolite formed or not. An optical microphotograph of each compound showed the formation of the fibrous zeolite.

Comparative Example 1

90 g of tetraethyl orthosilicate and 439 g of 20% aqueous tetrapropylammonium hydroxide (TPAOH/Si=1.0) solution were mixed by agitation. In a separate vessel, 2.9 g of titanium butoxide (Ti/Si=0.02) was diluted with 60 g of isopropyl alcohol, and the diluted solution was then slowly dropped into the reaction mixture. Thereafter, the reaction mixture was heated to the temperature of about 85° C. to eliminate the alcohol. 234 g of water was then added to the reaction mixture. The reaction mixture was reacted for 100 hours under atmospheric pressure and at a temperature of 80° C. to form crystal particles.

A mother liquor containing the crystal particles was centrifuged to separate the crystal particles. The size of the crystal particles contained in the mother liquor was confirmed to be 100 nm by the DLS method. The obtained crystal particles were dispersed in water in the concentration of 50 wt %, and then dried and analysed according to the same method as described in Example 1. Analysis results showed that the zeolite crystal did not form the fibrous zeolite.

Comparative Example 2

90 g of tetraethyl orthosilicate and 439 g of 20% aqueous tetrapropylammonium hydroxide (TPAOH/Si=1.0) solution were mixed by agitation. In a separate vessel, 2.9 g of titanium butoxide (Ti/Si=0.02) was diluted with 60 g of isopropyl alcohol, and the diluted solution was then slowly dropped into the reaction mixture. Thereafter, the reaction mixture was heated to the temperature of about 85° C. to eliminate the alcohol. 234 g of water was then added to the reaction mixture. The reaction mixture was reacted for 100 hours under atmospheric pressure and at a temperature of 80° C. to form crystal particles.

1,000 g of water was added to the mother liquor containing the crystal particles and thereafter the mother liquor was centrifuged to separate the crystal particles. The size of the crystal particles contained in the mother liquor was confirmed to be 100 nm by the DLS method. The obtained crystal particles were dispersed in water in the concentration of 50 wt %, and then dried and analysed according to the same method as described in Example 1. Analysis results showed that the zeolite crystal did not form fibrous zeolite.

Comparative Example 3

90 g of tetraethyl orthosilicate and 220 g of 20% aqueous tetrapropylammonium hydroxide (TPAOH/Si=0.5) solution were mixed by agitation. In a separate vessel, 4.4 g of titanium butoxide (Ti/Si=0.03) was diluted with 60 g of isopropyl alcohol, and the diluted solution was then slowly dropped into the reaction mixture. Thereafter, the reaction mixture was heated to the temperature of about 85° C. to eliminate the alcohol. 1,300 g of water was then added to the mixture. The mixture was reacted for 90 hours under atmospheric pressure and at a temperature of 150° C. to form crystal particles, 150 nm in size.

Without performing the separation process for the crystal particles, the mother liquor was then dried for 6 hours at a temperature of 150° C. The zeolite crystal did not form fibrous zeolite.

Comparative Example 4

90 g of tetraethyl orthosilicate and 220 g of 20% aqueous tetrapropylammonium hydroxide (TPAOH/Si=0.5) solution were mixed by agitation. In a separate vessel, 4.4 g of titanium butoxide (Ti/Si=0.03) were diluted with 60 g of isopropyl alcohol, and then the diluted solution is slowly dropped into the reaction mixture. Thereafter, the reaction mixture is heated to the temperature of about 85° C. to eliminate the alcohol. 234 g of water was then added to the reaction mixture. The reaction mixture was placed in an autoclave and reacted at 150° C. to obtain a mother liquor containing particles, 120 nm in size.

The mother liquor was centrifuged to separate the crystal particles. The crystal particles were dispersed in water in the concentration of 10 wt %, and then dried and analysed according to the same method in Example 1. Analysis results showed that the zeolite crystal did not form fibrous zeolite.

Comparative Example 5

Existing ZCR-Z-Y 5.6 zeolite particle having a size of 1,000 nm (1 μm) was dispersed in water in the concentration of 10 wt %, and then dried and analysed according to the same method in Example 1. Analysis results showed that the fibrous zeolite was not formed.

TABLE 2

| | reaction condition[1] | | | | | | reformation condition for drying | | |
|---|---|---|---|---|---|---|---|---|---|
| | Ti/Si | H2O/Si | TPAOH/Si | reaction temp. (°C.) | particle size (nm) | density[2] | temp (°C.) | time (hr) | fibrous growth |
| example | | | | | | | | | |
| 1 | 0.03 | 20 | 0.35 | 80 | 60 | 0.5 | 100 | 10 | O |
| 2 | 0.03 | 20 | 0.35 | 80 | 60 | 2.0 | 100 | 10 | O |
| 3 | 0.04 | 20 | 0.35 | 80 | 120 | 0.5 | 100 | 10 | O |
| 4 | 0.1 | 20 | 0.35 | 80 | 110 | 0.5 | 100 | 10 | O |
| comp. example | | | | | | | | | |
| 1 | 0.02 | 30 | 1.0 | 80 | 100 | 50 | 100 | 10 | X |
| 2 | 0.02 | 30 | 1.0 | 80 | 100 | 50 | 100 | 10 | X |
| 3 | 0.03 | 30 | 0.5 | 150 | 150 | — | 150 | 5 | X |
| 4 | 0.03 | 30 | 0.5 | 150 | 120 | 10 | 100 | 10 | X |
| 5 | — | — | — | — | 1,000 | 10 | 100 | 10 | X |

[1]: reaction condition is based on the molar ratio.
[2]: density of particles is represented by weight % based on the weight of water.
O: fibrous zeolite is formed.
X: fibrous zeolite is not formed.

As described above, the fibrous zeolite formed by using zeolite crystals less than 150 nm in size according to the present invention is easy to use as a functional material, is easily adsorbed and desorbed when used as a catalyst, and can be directly used as a reinforcement material because of its fibrous form.

That is, unlike the conventional zeolite which requires a support when it is used as a catalyst, the fibrous zeolite of the present invention does not require a support and can be applied by itself.

Like this, if the zeolite is directly used as a catalyst without using support, it is easy to adsorb and desorb, thereby showing a highly reactive activity. Since the fibrous zeolite of the present invention can be directly manufactured in a mesh form, it is easy for a reactant to diffuse onto the catalyst surface.

Also, since the zeolite of the present invention is obtained in fibrous form, not only can it be used as a reinforcement material but also is capable of being spun as an other fiber, and hence, it can be manufactured into diverse forms according to the desired use.

What is claimed is:

1. A fibrous zeolite composed of silicon oxide and titanium oxide represented as;

$$xTiO_2 \cdot (1-x)SiO_2,$$

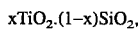

wherein x is 0.02–0.1.

2. A method of preparing a fibrous zeolite comprising the steps of:
   (i) (a) preparing at least one silicon oxide source selected from the group consisting of tetraethylorthosilicate and silica gel;
   (b) mixing said silicon oxide source with at least one organic base selected from the group consisting of tetramethylammonium hydroxide, tetraethylammonium hydroxide, tetrabutylammonium hydroxide, tetrapropylammonium bromide, pyrrolidine, propylamine, dipropylamine and tripropylamine in a molar ratio of 10:1–10:8, by agitation;
   (c) diluting a hydrolzable titanium compound with isopropyl alcohol to a final concentration of 15–25 wt %;
   (d) gradually adding said dilution product obtained in step (c) to said mixture obtained in step (b) until the molar ratio of said titanium compound and said silicon oxide source reaches 1:50–1:10;
   (e) heating said mixture obtained in step (d) to eliminate alcohol;
   (f) adding 15–50 moles of water per 1 mole of said silicon oxide source contained in said mixture obtained in step (e);
   (g) maintaining said mixture obtained in step (f) at a temperature range of from 60° to 100° C. and under atmospheric pressure to obtain a mother liquor containing zeolite crystals;
     (ii) centrifuging said mother liquor obtained in step (i) to separate said zeolite crystals; and
     (iii) dispersing the zeolite crystal obtained in step (ii) into water in the final concentration of 0.5–2 wt %, and evaporating the water to form a fibrous zeolite.

3. The method of preparing a fibrous zeolite as claimed in claim 2, wherein said titanium compound is at least one selected from the group consisting of titanium butoxide, titanium ethoxide, titanium isopropoxide, titanium tetrachloride and titanium oxychloride.

4. The method of preparing a fibrous zeolite as claimed in claim 2, wherein said preparation method further comprises a step of adding 100–400 wt % of water based on the weight of said mother liquor to said mother liquor just prior to centrifuging said mother liquor obtained in step (i).

* * * * *